United States Patent
Uzawa et al.

(10) Patent No.: US 12,423,852 B2
(45) Date of Patent: Sep. 23, 2025

(54) DEVICE AND METHOD FOR DIVIDING, SCALING, AND COMBINING SIMILAR ATTRIBUTES FOR OBJECT DETECTION

(71) Applicant: NTT, Inc., Tokyo (JP)

(72) Inventors: Hiroyuki Uzawa, Tokyo (JP); Shuhei Yoshida, Tokyo (JP); Koyo Nitta, Tokyo (JP)

(73) Assignee: NTT, Inc., Tokyo (JP)

( * ) Notice: Subject to any disclaimer, the term of this patent is extended or adjusted under 35 U.S.C. 154(b) by 530 days.

(21) Appl. No.: 17/799,528

(22) PCT Filed: Feb. 14, 2020

(86) PCT No.: PCT/JP2020/005812
§ 371 (c)(1),
(2) Date: Aug. 12, 2022

(87) PCT Pub. No.: WO2021/161513
PCT Pub. Date: Aug. 19, 2021

(65) Prior Publication Data
US 2023/0058896 A1    Feb. 23, 2023

(51) Int. Cl.
*G06K 9/00* (2022.01)
*G06T 3/40* (2006.01)
(Continued)

(52) U.S. Cl.
CPC ............... *G06T 7/70* (2017.01); *G06T 3/40* (2013.01); *G06T 7/11* (2017.01); *G06V 10/25* (2022.01); *G06V 2201/07* (2022.01)

(58) Field of Classification Search
CPC .............. H04N 19/176; H04N 19/119; G06T 2207/20084; G06T 7/11; G06T 3/40; G06V 10/82
See application file for complete search history.

(56) References Cited

U.S. PATENT DOCUMENTS

2019/0188516 A1* 6/2019 Porter .................. G06V 10/48
2019/0325605 A1* 10/2019 Ye ....................... G06F 18/2431

OTHER PUBLICATIONS

Růžička, Vít, and Franz Franchetti. "Fast and accurate object detection in high resolution 4K and 8K video using GPUs." 2018 IEEE High Performance extreme Computing Conference (HPEC). IEEE, 2018. (Year: 2018).*

(Continued)

*Primary Examiner* — Gregory A Morse
*Assistant Examiner* — Owais Iqbal Memon
(74) *Attorney, Agent, or Firm* — Slater Matsil, LLP

(57) ABSTRACT

An image processing device includes a division circuit that divides an input image and outputs a plurality of divided images, a first processor that performs computation of an object detection model and acquires attribute information including an attribute value of an object included in each of the divided images and a first quadrangular frame surrounding the object as first metadata, a scaling circuit that output an overall image obtained by shrinking the input image, a second processor that performs computation of the object detection model and acquires attribute information including an attribute value of an object included in the overall image and a second quadrangular frame as second metadata, and a third processor that generates third metadata of the input image by combining pieces of the attribute information of the second metadata and pieces of attribute information that are not held in common by the first and second metadata.

10 Claims, 12 Drawing Sheets

(51) Int. Cl.
     *G06T 7/11*      (2017.01)
     *G06T 7/70*      (2017.01)
     *G06V 10/25*     (2022.01)

(56) References Cited

OTHER PUBLICATIONS

Liu, Wei, et al. "Ssd: Single shot multibox detector." Computer Vision-ECCV 2016: 14th European Conference, Amsterdam, The Netherlands, Oct. 11-14, 2016, Proceedings, Part I 14. Springer International Publishing, 2016. (Year: 2016).*

Liu, W. et al., "SSD: Single Shot MultiBox Detector," arXiv:1512.02325v5, Conference paper, Dec. 29, 2016, 17 pages.

Redmon, J. et al., "YOLOv3: An Incremental Improvement," Computer Science, Computer Vision and Pattern Recognition, arXiv:1804.02767, Apr. 8, 2018, 13 pages.

Ruzicka, V. et al., "Fast and accurate object detection in high resolution 4K and 8K video using GPUs," 2018 IEEE High Performance extreme Computing Conference (HPEC), Sep. 1, 2018, 8 pages.

* cited by examiner

DEVICE AND METHOD FOR DIVIDING, SCALING, AND COMBINING SIMILAR ATTRIBUTES FOR OBJECT DETECTION

This patent application is a national phase filing under section 371 of PCT application no. PCT/JP2020/005812, filed on Feb. 14, 2020, which application is hereby incorporated herein by reference in its entirety.

TECHNICAL FIELD

The present invention relates to an image processing device, an image processing system, an image processing method, and an image processing program, and in particular to an image processing technique used for object detection.

BACKGROUND

In recent years, a technique for detecting an object at a high speed using deep learning has been proposed. YOLO (You Only Look Once) and SSD (Single Shot multibox Detector) are known as typical models using a single-stage method for processing region extraction and category identification simultaneously at a high speed in one network (see NPL 1 and NPL 2). This kind of object detection technique is being considered for use in surveillance cameras, AI image processing in edge computing, and the like.

For example, in object detection using YOLOv3 described in NPL 1, an input image is used which is obtained by resizing the size of an original image to 320 (width)×320 (height) pixels, 416×416 pixels, or 608×608 pixels.

For example, if the original image is a high-definition image such as full HD or 4K, it is necessary to shrink the image under the above-mentioned image size restrictions. By shrinking the high-definition image, characteristic portions of an object included in the image are also shrunk, and therefore it may be difficult to detect an object that is relatively small with respect to the input image.

In view of this, for example, NPL 3 discloses a technique in which an input image is divided into a plurality of images and object detection is performed on each of the divided images. However, for a relatively large object that straddles divided images, the characteristic portion of the object is also divided, and therefore it may be difficult to detect a large object in this instance.

CITATION LIST

Non-Patent Literature

[Non-Patent Literature 1] Joseph Redmon et al., "YOLOv3: An Incremental Improvement", https://arxiv.org/abs/1804.02767 (https://arxiv.org/pdf/1804.02767.pdf).

[Non-Patent Literature 2] Wei Liu et al., "SSD: Single Shot MultiBox Detector", https://arxiv.org/abs/1512.02325 (https://arxiv.org/pdf/1512.02325.pdf).

[Non-Patent Literature 3] Vit Ruzicka et al., "Fast and accurate object detection in high resolution 4K and 8K video using GPUs", 2018 IEEE High Performance extreme Computing Conference (HPEC).

SUMMARY

Technical Problem

In the conventional technique, if a high-definition image is used as an input image, it is difficult to detect both a relatively large object and a relatively small object included in the input image using an object detection model based on deep learning.

Embodiments of the present invention can solve the above-described problems, and an embodiment thereof realizes an image processing technique according to which both a relatively large object and a relatively small object included in an input image can be detected using an object detection model based on deep learning, even if a high-definition image is used as the input image.

Means for Solving the Problem

In order to solve the above-described problems, the image processing device according to embodiments of the present invention includes: a division unit configured to divide an input image and output a plurality of first images; a first processing unit configured to perform computation of an object detection model prepared in advance by providing each of the plurality of first images as inputs to the object detection model, and to acquire a set of pieces of attribute information including an attribute value of an object included in each of the plurality of first images and a first region surrounding the object, as first metadata of the first image; a scaling unit configured to output a second image obtained by shrinking the input image; a second processing unit configured to perform computation of the object detection model by providing the second image as an input to the object detection model, and to acquire a set of pieces of attribute information including an attribute value of an object included in the second image and a second region surrounding the object, as second metadata of the second image; and a compositing processing unit configured to generate third metadata of the input image by combining the set of pieces of attribute information of the second metadata and a set of pieces of attribute information that are not held in common by the second metadata and the first metadata, in which the first region includes coordinate information in the input image, and the second region includes coordinate information in the input image.

In order to solve the above-described problems, an image processing system according to embodiments of the present invention includes the above-described image processing device, a division unit, a division apparatus, a scaling apparatus, a second processing apparatus, and a compositing processing apparatus, in which the division apparatus divides an input image and outputs a plurality of third images, a plurality of the image processing devices are provided, and each of the image processing devices uses any one of the plurality of third images as an input to generate fourth metadata indicating a set of pieces of attribute information of the third image. Each of the image processing devices includes: the division unit configured to divide the third image and output a plurality of first images; the first processing unit configured to perform computation of an object detection model prepared in advance by providing each of the plurality of first images as inputs to the object detection model, and to acquire a set of pieces of attribute information including an attribute value of an object included in each of the plurality of first images and a first region surrounding the object, as first metadata of the first image; the scaling unit configured to output a second image obtained by shrinking the third image; the second processing unit configured to perform computation of the object detection model by providing the second image as an input to the object detection model, and to acquire a set of pieces of attribute information including an attribute value of an object included in the second image and a second region surrounding the object, as second metadata of the second image; and the compositing processing unit configured to generate the fourth metadata of the third image by combining the set of pieces of attribute information of the second metadata and the set of pieces of attribute information that are not held in common by the second metadata and the first metadata. The first region includes coordinate information in the input image, the second region includes coordinate information in the input image, the scaling apparatus outputs a fifth image obtained by shrinking the input image, the second processing apparatus performs computation of an object detection model prepared in advance by providing the fifth image as an input to the object detection model and acquires a set of pieces of attribute information including an attribute value of an object included in the fifth image and a third region surrounding the object as fifth metadata of the fifth image, the compositing processing apparatus generates sixth metadata of the input image by combining the set of pieces of attribute information of the fifth metadata and a set of pieces of attribute information that are not held in common by the fifth metadata and the fourth metadata, and the third region includes coordinate information in the input image.

In order to solve the above-described problems, an image processing method according to embodiments of the present invention includes: a division step of dividing an input image and outputting a plurality of first images; a first processing step of performing computation of an object detection model prepared in advance by providing each of the plurality of first images as inputs to the object detection model, and acquiring a set of pieces of attribute information including an attribute value of an object included in each of the plurality of first images and a first region surrounding the object, as first metadata of the first image; a scaling step of outputting a second image obtained by shrinking the input image; a second processing step of performing computation of the object detection model by providing the second image as an input to the object detection model, and acquiring a set of pieces of attribute information including an attribute value of an object included in the second image and a second region surrounding the object, as second metadata of the second image; and a compositing processing step of generating third metadata of the input image by combining the set of pieces of attribute information of the second metadata and a set of pieces of attribute information that are not held in common by the second metadata and the first metadata, in which the first region includes coordinate information in the input image, and the second region includes coordinate information in the input image.

In order to solve the above-described problems, an image processing program according to embodiments of the present invention causes a computer to execute: a division step of dividing an input image and outputting a plurality of first images; a first processing step of performing computation of an object detection model prepared in advance by providing each of the plurality of first images as inputs to the object detection model, and acquiring a set of pieces of attribute information including an attribute value of an object included in each of the plurality of first images and a first region surrounding the object, as first metadata of the first image; a scaling step of outputting a second image obtained by shrinking the input image; a second processing step of performing computation of the object detection model by providing the second image as an input to the object detection model, and acquiring a set of pieces of attribute information including an attribute value of an object included in the second image and a second region surrounding the object, as second metadata of the second image; and a compositing processing step of generating third metadata of the input image by combining the set of pieces of attribute information of the second metadata and a set of pieces of attribute information that are not held in common by the second metadata and the first metadata, in which the first region includes coordinate information in the input image, and the second region includes coordinate information in the input image.

Effects of Embodiments of the Invention

According to embodiments of the present invention, the third metadata of the input image is generated by combining the set of pieces of attribute information of the second metadata and the set of pieces of attribute information that are not held in common by the set of pieces of attribute information of the second metadata of the second image obtained by shrinking the input image and the first metadata of the plurality of first images obtained by dividing the input image. For this reason, both a relatively large object and a small object included in an input image that is a high-definition image can be detected using an object detection model based on deep learning.

DETAILED DESCRIPTION OF ILLUSTRATIVE EMBODIMENTS

Hereinafter, preferred embodiments of the present invention will be described in detail with reference to FIGS. 1 to 12.

Summary of Embodiments of the Invention

First, an overview of an image processing device 1 according to an embodiment of the present invention will be described with reference to FIG. 1. In the image processing device 1 according to the present embodiment, division processing for performing object detection on each divided image obtained by dividing an input image $I_{in}$ into a plurality of images, and overall processing for performing object detection in an overall image obtained by shrinking the input image $I_{in}$ are executed.

Figure 2:
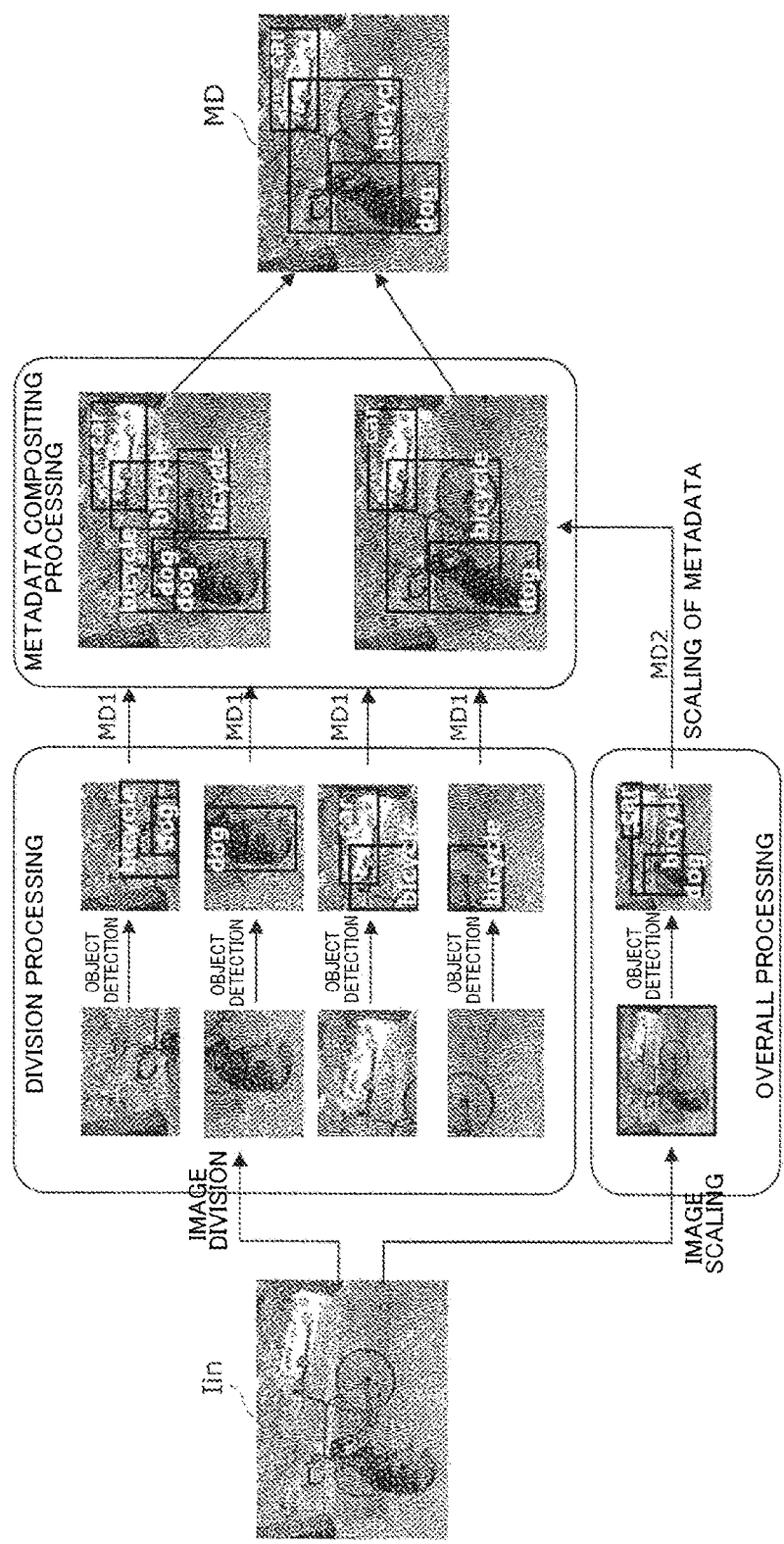
FIG. 2 is an illustrative diagram showing an overview of the image processing device according to the first embodiment.

In the division processing, as shown in FIG. 2, object detection is performed using an object detection model prepared in advance on each divided image, and as a result of the object detection, metadata MD1 (first metadata) including a set of pieces of attribute information of the divided image is acquired. On the other hand, in the overall processing, object detection is performed on the overall image using an object detection model prepared in advance, and as a result of the object detection, metadata MD2 (second metadata) including a set of pieces of attribute information of the overall image is acquired.

The attribute information of the metadata MD1 of the divided image generated by the image processing device 1 through division processing includes the attribute value of the object included in the divided image (e.g., "dog" shown in FIG. 2) and a quadrangular frame (first region) surrounding the object. The quadrangular frame surrounding the object included in the metadata MD1 includes coordinate information in the input image $I_{in}$.

Similarly, the attribute information of the metadata MD2 of the overall image includes the attribute value of the object included in the overall image and the quadrangular frame (second area) surrounding the object. The quadrangular frame surrounding the object included in the metadata MD2 includes the coordinate information in the input image $I_{in}$ of the object.

Also, the image processing device 1 according to the present embodiment executes compositing processing (third processing) in which the set of pieces of attribute information of the metadata MD2 of the overall image and the set of pieces of attribute information not held in common with the metadata MD1 of the divided image are combined and generated as metadata MD (third metadata) of the input image $I_{in}$. The metadata MD to be added to the input image $I_{in}$, which is image data, is additional information in which overlapping of metadata is eliminated between the divided image and the overall image, that is, it is additional information obtained by interpolating the metadata MD2 of the overall image with the metadata MD1 of the divided image. The metadata MD is the final result of object detection of the input image $I_{in}$.

In this manner, the image processing device 1 according to the present embodiment interpolates the metadata MD2 of the overall image in which the object that could not be detected in the overall image exists with the metadata MD1 including the object detected only in the divided image. The image processing device 1 according to the present embodiment can detect objects of both large and small sizes included in the input image $I_{in}$ even if a high-definition image is used as the input image $I_{in}$.

First Embodiment

First, a functional configuration of the image processing device 1 according to the first embodiment of the present invention will be described with reference to the block diagram of FIG. 1. As shown in FIG. 1, the image processing device 1 uses the input image $I_{in}$ as an input to perform division processing (first processing), overall processing (second processing), and compositing processing (third processing), and generate and output the metadata MD of the input image $I_{in}$.

Functional Blocks of an Image Processing Device

The image processing device 1 includes a first processing unit 110, a second processing unit 120, and a third processing unit 130.

The first processing unit 110 includes a division unit 111, a scaling unit 112, an object detection unit 113, and a metadata adjustment unit 114. The first processing unit 110 is a functional block that executes the division processing described with reference to FIG. 2.

The division unit in divides the original image of the high-definition image input as the input image $I_{in}$ into a plurality of divided images (first images) and outputs the plurality of divided images. For example, the size of the input image $I_{in}$ is $W_{in}$ (width)×$H_{in}$ (height). As shown in FIG. 2, the width of the input image $I_{in}$ refers to the length along the left-right direction of the sheet surface, and the height of the input image $I_{in}$ refers to the length in the vertical direction of the sheet surface.

The division unit in divides the input image $I_{in}$ into a plurality of divided images, with a number of divisions $N_w$ in the width direction and a number of divisions $N_h$ in the height direction of the input image $I_{in}$. In the "division processing" of FIG. 2 and in the example shown in FIG. 4, the input image $I_{in}$ is divided into a total of four divided images in which $N_w$=2 and $N_h$=2 are satisfied.

The scaling unit 112 performs scaling processing for shrinking each of the plurality of divided images to a specified image size that can be input to an object detection model based on deep learning. The scaling unit 112 reduces the image size while maintaining parameter values such as the ratio between the width and height of each divided image so as to correspond to the size of the input image of the object detection model used by a later-described object detection unit 113.

The object detection unit 113 uses the divided image shrunk by the scaling unit 112 as an input to perform calculation of a learned object detection model based on predetermined deep learning, and acquires a set of pieces of attribute information including an attribute value of the object included in the divided image and a quadrangular frame (first region) surrounding the object having the coordinate information of the object in the input image $I_{in}$ as the metadata MD1 of the divided image. In this manner, the metadata MD1 is a set of pieces of attribute information including the attribute value of the object and the quadrangular frame.

The quadrangular frame that surrounds the object detected in the divided image, which is included in the metadata MD1 acquired by the object detection unit 113, is also called a bounding box, and for example, has the smallest rectangular range that can circumscribe and surround the detected object. In the following description, the quadrangular frame surrounding the object included in the metadata MD1 is referred to as "quadrangular frame BB1" for clarity.

Here, the input image $I_{in}$ shown in FIG. 2 includes a dog, a bicycle, and a car, and the dog is sitting in the foreground, the bicycle is leaning against a wall behind the dog, and the car is parked on the other side of a road. For example, it is assumed that "dog", "bicycle", and "car" are used as the attribute values of object detection representing the unique forms, shapes, and properties of the objects.

As shown in the "division processing" of FIG. 2, the input image $I_{in}$ is divided into four divided images. Also, each divided image is input to the learned object detection model by the object detection unit 113, the objects included in each divided image are detected, and a quadrangular frame BB1 is created for each detected object. For example, in the "division processing" of FIG. 2, although the uppermost divided images include the upper part of the bicycle and the dog's head, the object detection unit 113 detects these objects (the attribute values "bicycle" and "dog" shown in FIG. 2) and designates the quadrangular frames BB1 based on portions of the objects.

Also, in the third divided image from the top shown in the "division processing" of FIG. 2, a car (attribute value "car" in FIG. 2) is detected and a quadrangular frame BB1 is designated. In this manner, boundaries between images of part or all of the objects (attribute values "dog", "bicycle", and "car" in FIG. 2) of the respective objects detected in each divided image in the "division processing" in FIG. 2 are designated by the quadrangular frames BB1.

Here, the quadrangular frame BB1 includes at least center coordinates (X, Y), a frame height "H", and a frame width "W". These are the position information of the object in the input image $I_{in}$, which indicates the positional relationship corresponding to the input image $I_{in}$ shrunk by the scaling unit 112.

The object detection unit 113 uses, for example, an object detection model such as YOLO using a convolutional neural network (CNN) learned in advance by a computing apparatus such as an external server to detect an object included in a divided image shrunk by the scaling unit 112 using the divided image as input, and obtains the metadata MD1 of the divided image.

The metadata adjustment unit 114 performs adjustment processing of the metadata MD1 for mapping the quadrangular frame BB1 of the object detected by the object detection unit 113 to the original undivided image, that is, the input image $I_{in}$.

Here, as described above, the size of the input image $I_{in}$ is $W_{in}$(width)×$H_{in}$ (height), and the designated image size that can be input to the object detection model prepared in advance is $W_{det}$ (width)×$H_{det}$ (height). In this case, the number of divisions $N_w$ in the width direction and the number of divisions $N_h$ in the height direction of the input image $I_{in}$ are provided by the following equations (1) and (2).

$$\text{Equation}(1): N_w = \min(N_{w\_max}, \text{ceiling}(W_{in}/W_{det})) \quad (1)$$

$$\text{Equation}(2): N_h = \min(N_{h\_max}, \text{ceiling}(H_{in}/H_{det})) \quad (2)$$

In the above equations (1) and (2), $N_{w\_max}$ indicates the upper limit of the number of divisions of the input image $I_{in}$ in the width direction, and $N_{h\_max}$ indicates the upper limit of the number of divisions of the input image $I_{in}$ in the height direction.

Figure 4:
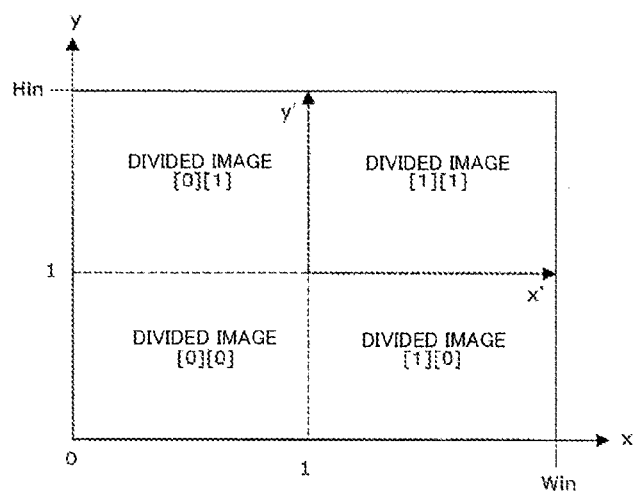
FIG. 4 is a diagram for illustrating divided images processed by the image processing device according to the first embodiment.

FIG. 4 shows an example of a divided image when $N_w$ is 2 and $N_h$ is 2. The coordinates (x', y') of each divided image in FIG. 4 are 0≤x'≤floor($W_{in}/N_w$) and 0≤y'≤floor($H_{in}/N_h$).

The metadata adjustment unit 114 maps the coordinates of the quadrangular frame BB1 surrounding the object detected in the divided image to the input image $I_{in}$, which is the original image. More specifically, the center coordinates of the quadrangular frame BB1 of the object detected in divided images [i] and [j] (0≤i≤$N_w$−1, 0≤j≤$N_h$−1) are ($x_{bb\_div}$, $y_{bb\_div}$), the width is $w_{bb\_div}$, and the height is $h_{bb\_div}$, and the center coordinates of the quadrangular frame BB1 adjusted to the coordinates of the original image are ($x_{bb}$, $y_{bb}$), the width is $w_{bb}$, and the height is $h_{bb}$. The metadata adjusting unit 114 maps the quadrangular frame BB1 to the input image $I_{in}$ based on the following equations.

$$\text{Equation}(3): x_{bb} = x_{bb\_div} \times \text{floor}(W_{in}/N_w) + \text{floor}(W_{in}/N_w) \times i \quad (3)$$

$$\text{Equation}(4): y_{bb} = y_{bb\_div} \times \text{floor}(H_{in}/N_h) + \text{floor}(H_{in}/N_h) \times j \quad (4)$$

$$\text{Equation}(5): w_{bb} = w_{bb\_div} \times \text{floor}(W_{in}/N_w) \quad (5)$$

$$\text{Equation}(6): h_{bb} = h_{bb\_div} \times \text{floor}(H_{in}/N_h) \quad (6)$$

Next, the second processing unit 120 will be described. The second processing unit 120 is a functional block that executes the overall processing described with reference to FIG. 2. As shown in FIG. 1, the second processing unit 120 includes a scaling unit 121, an object detection unit 122, and a metadata scaling unit 123.

The scaling unit 121 shrinks the input image $I_{in}$ of the high-definition image to a designated image size that can be input to the object detection model obtained based on predetermined deep learning, and outputs the shrunk overall image (second image). The scaling unit 121 can reduce the image size while maintaining the ratio of the width and the height of the input image $I_{in}$, for example.

The object detection unit 122 provides the overall image as an input to the object detection model prepared in advance, performs the computation of the object detection model, and outputs a set of pieces of attribute information including the attribute value of the object included in the overall image and a second region surrounding the object (hereinafter referred to as "quadrangular frame BB2" for clarity) as the metadata MD2 of the overall image. The quadrangular frame BB2 includes the coordinate information in the input image $I_{in}$ of the corresponding object. In this manner, the metadata MD2 is a set of pieces of attribute information including the attribute value of the object and the quadrangular frame BB2.

For example, in the "overall processing" shown in FIG. 2, the boundaries of the images of the respective objects of the attribute values "dog", "bicycle", and "car" of the objects detected in the overall image are designated by the quadrangular frames BB2.

Also, the object detection unit 122 uses, for example, an object detection model such as YOLO using a convolutional neural network (CNN) learned in advance by a computation apparatus such as an external server. The object detection unit 122 detects an object included in the overall image using the overall image shrunk by the scaling unit 121 as an input. In the object detection model used by the object detection unit 122, the size of the input image is designated in advance, similarly to the object detection model used in the first processing unit 110.

The metadata scaling unit 123 performs scaling processing for enlarging the region of the quadrangular frame BB2 of the object included in the metadata MD2 of the overall image generated by the object detection unit 122. The metadata scaling unit 123 performs scaling of the quadrangular frame BB2 included in the metadata MD2 of the overall image using, for example, a bilinear interpolation method.

For example, it is assumed that the width of the input image $I_{in}$, which is the original image, is $W_{in}$, the height is $H_{in}$, the width of the overall image shrunk by the scaling unit 121 is $W_{det}$, and the height is $H_{det}$. In this case, the metadata scaling unit 123 maps the quadrangular frame BB2 to the input image $I_{in}$ that is the original image by scaling the center coordinates $(X_{bb}, Y_{bb})$ of the quadrangular frame BB2 to $(X_{bb} \times W_{in}/W_{det}, Y_{bb} \times H_{in}/H_{det})$, and scaling the width $W_{bb}$ and height $H_{bb}$ of the quadrangular frame BB2 to $W_{bb} \times W_{in}/W_{det}, H_{bb} \times H_{in}/H_{det}$.

Next, the configuration of the third processing unit 130 will be described. The third processing unit 130 combines the set of pieces of attribute information that are not held in common by the metadata MD2 of the overall image and the metadata MD1 of the divided image shown in FIG. 2, and generates the result as the metadata MD of the input image $I_{in}$ (third metadata). As shown in FIG. 1, the third processing unit 130 includes a sorting unit 131 and a compositing unit 132. Also, the sorting unit 131 includes a calculation unit 310 and a determination unit 311.

If the attribute value of the object included in the metadata MD2 of the overall image generated by the second processing unit 120 and the attribute value of the object included in the metadata MD1 of the divided image generated by the first processing unit 110 match each other, the calculation unit 310 obtains an overlap degree (first value) obtained by subtracting, from the area of the quadrangular frame BB1 of the metadata MD1, the area by which the quadrangular frame BB2 of the metadata MD2 and the quadrangular frame BB1 of the metadata MD1 overlap each other. The overlap degree is an index representing the degree of overlap between pieces of attribute information of the metadata.

The determination unit 311 determines whether or not the overlap degree obtained by the calculation unit 310 exceeds a pre-set first threshold value.

If the determination unit 311 determines that the overlap degree exceeds the first threshold value, the sorting unit 131 determines that the attribute information of the metadata MD1 of the divided image is held in common with the attribute information of the metadata MD2 of the overall image, and removes the attribute information held in common from the metadata MD1.

The compositing unit 132 generates the metadata MD of the input image Ii, by combining the metadata MD1 of the divided image from which the attribute information of the metadata held in common has been removed by the sorting unit 131 and the metadata MD2 of the overall image. That is, the compositing unit 132 generates the metadata MD of the input image $I_{in}$ by interpolating the metadata MD2 of the overall image with the metadata MD1 of the divided image from which the overlapping attribute information is excluded.

Hardware Configuration of an Image Processing Device

Next, an example of a computer configuration for realizing the image processing device 1 having the above-described functions will be described with reference to FIG. 3.

Figure 3:
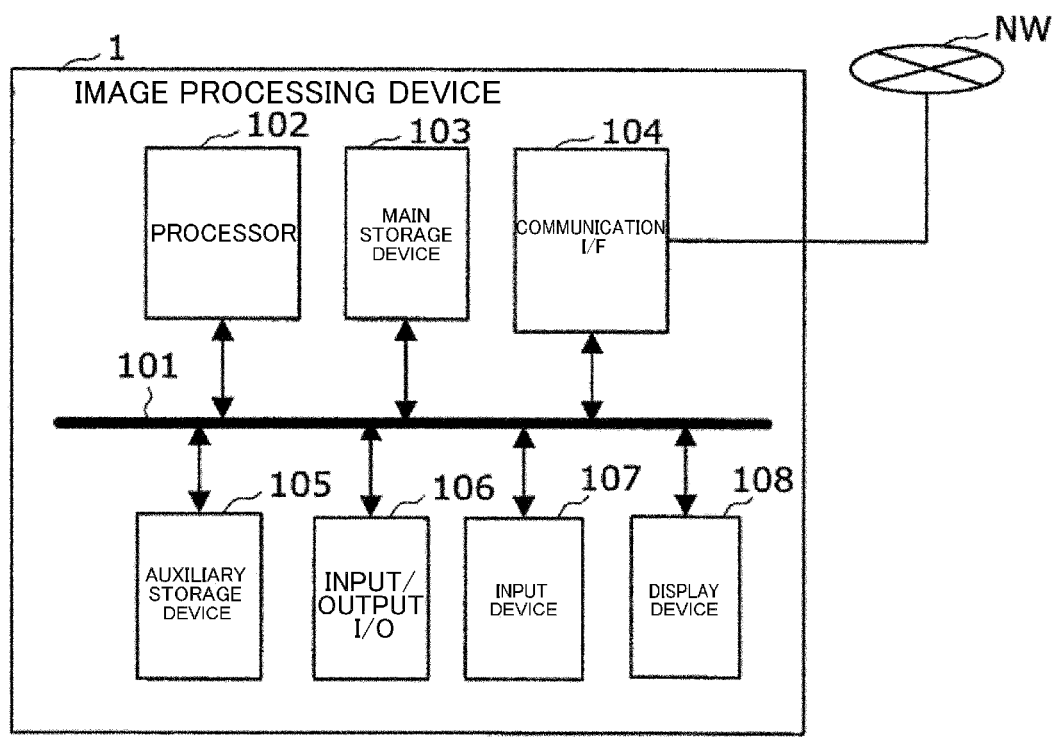
FIG. 3 is a block diagram showing an example of a computer configuration for realizing the image processing device according to the first embodiment.

As shown in FIG. 3, the image processing device 1 can be realized by a computer including, for example, a processor 102, a main storage device 103, a communication I/F 104, an auxiliary storage device 105, and an input/output I/O 106 connected via a bus 101, and by a program that controls these hardware resources. In the image processing device 1, for example, an external input device 107 and a display device 108 are connected to each other via the bus 101.

A program for the processor 102 to perform various controls and computations is stored in advance in the main storage device 103. The main storage device 103 is constituted by a semiconductor memory or the like. The processor 102 and the main storage device 103 realize each function of the image processing device 1 including the first processing unit 110, the second processing unit 120, and the third processing unit 130 shown in FIG. 1.

The processor 102 can be realized by a GPU, a CPU, an FPGA, or the like that forms any logic circuit.

The communication I/F 104 is an interface circuit for communicating with various types of external electronic devices via the communication network NW. For example, an object detection model learned in advance by an external server (not shown) or the like can be received from the communication I/F 104 and stored in the later-described auxiliary storage device 105. The communication I/F 104 may also transmit the input image $I_{in}$ and the metadata MD that is the output data to a pre-set external server or the like.

For example, a communication control circuit and an antenna compatible with wireless data communication standards such as 3G, 4G, 5G, wireless LAN, and Bluetooth (registered trademark) are used as the communication I/F 104.

The auxiliary storage device 105 is constituted by a readable and writable storage medium and a drive apparatus for reading and writing various types of information such as programs and data in the storage medium. A semiconductor memory such as a hard disk or a flash memory can be used as the storage medium in the auxiliary storage device 105.

The auxiliary storage device 105 has a program storage region for storing various types of parameters and programs for the image processing device 1 to perform image processing including division processing, overall processing, and compositing processing. Also, the auxiliary storage device 105 stores a learned object detection model based on deep learning to be used by the image processing device 1 for object detection processing. The above-described auxiliary storage device 105 may also have, for example, a backup region for backing up the above-described data, programs, and the like.

The input/output I/O 106 is constituted by an I/O terminal for inputting signals from an external device and outputting signals to an external device.

The input device 107 is constituted by a keyboard, a touch panel, or the like, receives operation input from the outside, and generates a signal corresponding to the operation input.

The display device 108 is realized by a liquid crystal display or the like. The display device 108 can display the input image $I_{in}$, the metadata MD that is the output data, and the like.

Overview of Operations of an Image Processing Device

Next, operations of the image processing device 1 having the above-described configuration will be described with reference to the flowcharts of FIGS. 5 to 9. Note that hereinafter, it is assumed that the learned object detection model is stored in the auxiliary storage device 105.

Figure 5:
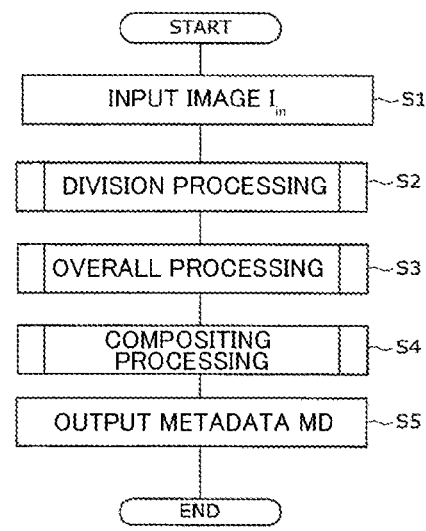
FIG. 5 is a flowchart for illustrating operations of the image processing device according to the first embodiment.

FIG. 5 is a flowchart for describing an overview of the operations of the image processing device 1. As shown in FIG. 5, first, the input image $I_{in}$ is input (step S1). For example, an image captured by an external camera or the like (not shown) is received by the communication I/F 104 and is input to the image processing device 1 as the input image $I_{in}$. Also, a high-definition image or the like is used as the input image In.

Next, the first processing unit 110 executes division processing on each of the plurality of divided images obtained by dividing the input image $I_{in}$ (step S2). Next, the second processing unit 120 executes overall processing on the overall image obtained by shrinking the input image $I_{in}$ (step S3).

Thereafter, the third processing unit 130 performs metadata compositing processing based on the result of the division processing in step S2 and the result of the overall processing in step S3 (step S4). Thereafter, the third processing unit 130 outputs the metadata MD of the input image $I_{in}$ (step S5). The division processing in step S2 and the overall processing in step S3 may also be executed in parallel, and the order in which step S2 and step S3 are executed may also be reversed.

Division Processing

Figure 6:
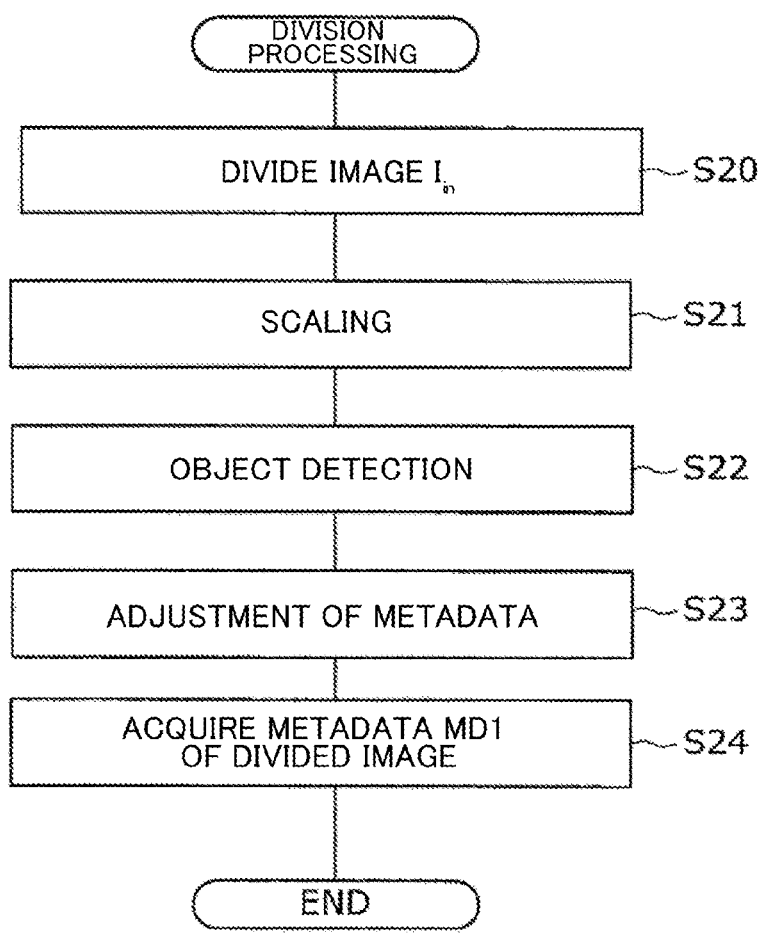
FIG. 6 is a flowchart for illustrating division processing performed by the image processing device according to the first embodiment.

Next, division processing (step S2 in FIG. 5) will be described in more detail using the flowchart of FIG. 6.

First, the division unit 11 divides the input image Ii, and outputs a plurality of divided images (step S20). For example, the division unit 11 can divide the input image $I_{in}$ having an image size of $W_{in}$ (width)×$H_{in}$ (height) into four and generate four divided images as shown in FIG. 4.

Next, the scaling unit 112 scales each divided image to a pre-set image size (step S21). More specifically, the scaling unit 112 shrinks each divided image so that the size of the divided image corresponds to a designated input image size of the object detection model used by the object detection unit 113. Note that if the size of the input image $I_{in}$ is divisible by the image size to be used in the object detection process by the object detection unit 113, the scaling process in step S21 is omitted.

Next, using the divided image scaled to the designated image size as an input, the object detection unit 113 reads out the learned object detection model obtained based on the deep learning stored in the auxiliary storage device 105, performs computation of the learned object detection model, and detects the object included in the divided image (step S22). More specifically, the object detection unit 113 acquires a set of pieces of attribute information including the attribute value of the object included in the divided image and the quadrangular frame BB1 surrounding the object as the metadata MD1 of the divided image.

Next, the metadata adjusting unit 114 maps the coordinates of the quadrangular frame BB1 of the object included in the metadata MD1 of the divided image to the input image $I_{in}$ that is the original image by using the above equations (3) to (6) (step S23).

Thereafter, the metadata adjustment unit 114 outputs the metadata MD1 of the divided image (step S24). The metadata MD1 of each divided image is input to the third processing unit 130.

Overall Processing

Next, the overall processing (step S3 in FIG. 5) for the input image $I_{in}$, which is executed by the second processing unit 120, will be described in more detail with reference to the flowchart of FIG. 7.

Figure 7:
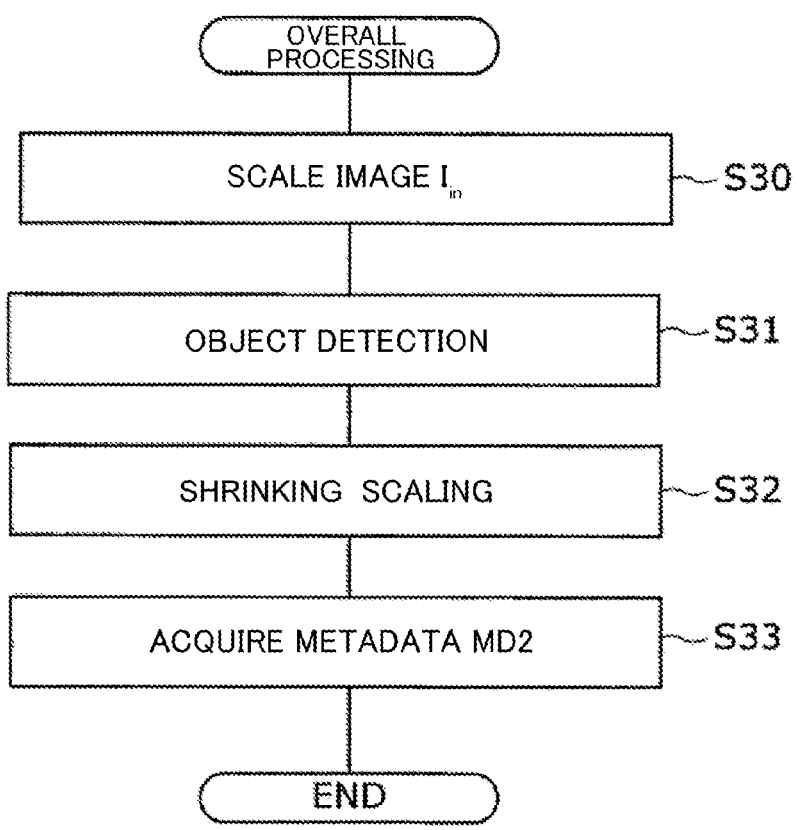
FIG. 7 is a flowchart for illustrating overall processing performed by the image processing device according to the first embodiment.

As shown in FIG. 7, first, the scaling unit 121 shrinks the input image $I_{in}$ to a designated image size (step S30). More specifically, the scaling unit 121 shrinks the input image $I_{in}$ to a designated image size that can be input to the object detection model to be used by the object detection unit 122, and outputs the overall image that was shrunk.

Next, the object detection unit 122 reads out the learned object detection model stored in the auxiliary storage device 105, and, using the overall image scaled in step S30, performs computation of the object detection model, and acquires a set of pieces of attribute information including the attribute of the object included in the overall image and the quadrangular frame BB2 of the object as the metadata MD2 of the overall image (step S31).

Next, the metadata scaling unit 123 performs scaling for expanding the quadrangular frame BB2 of the object included in the metadata MD2 of the overall image generated in step S31 (step S32). The metadata scaling unit 123 performs scaling of the quadrangular frame BB2 using, for example, a bilinear interpolation method, and maps the quadrangular frame BB2 to the input image $I_{in}$.

Thereafter, the metadata scaling unit 123 outputs the metadata MD2 obtained by scaling each quadrangular frame BB2 and mapping the result to the input image $I_{in}$ (step S33). The metadata MD2 is input to the third processing unit 130.

Compositing Processing

Next, compositing processing (step S4 in FIG. 5) executed by the third processing unit 130 will be described with reference to the flowcharts of FIGS. 8 and 9.

Figure 8:
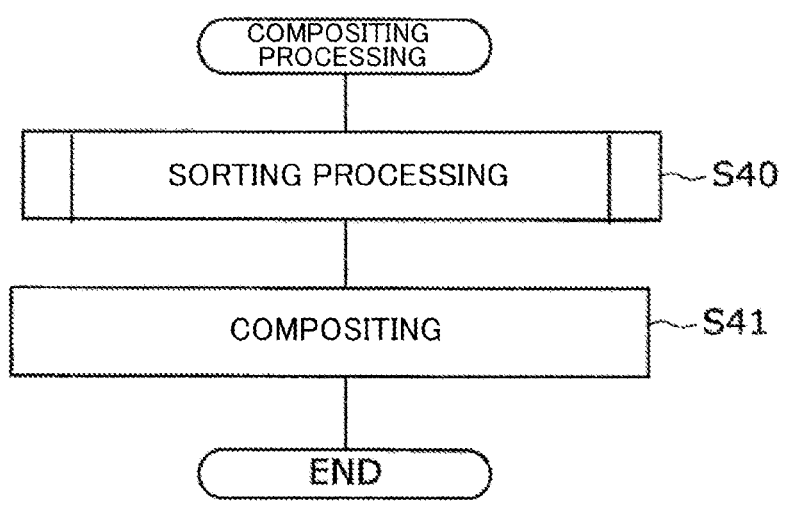
FIG. 8 is a flowchart for illustrating compositing processing performed by the image processing device according to the first embodiment.

As shown in FIG. 8, the sorting unit 131 executes the metadata sorting processing for each divided image based on the metadata MD1 of the divided image and the metadata MD2 of the overall image (step S40).

Here, the sorting processing of step S40 will be described in more detail with reference to the flowchart of FIG. 9. Note that the metadata MD1 and MD2 are sets of pieces of attribute information including the attribute value of the object detected from the image and the quadrangular frames BB1 and BB2 surrounding the object. For example, each of the plurality of pieces of attribute information included in the metadata MD1 and MD2 includes, for example, information on the attribute value (e.g., "dog") of each object detected from the image through object detection and information (coordinates and size) of the quadrangular frames BB1 and BB2 created for the detected object. In FIG. 9, a case in which the sorting processing is executed for each piece of attribute information of each divided image will be described as an example.

Figure 9:
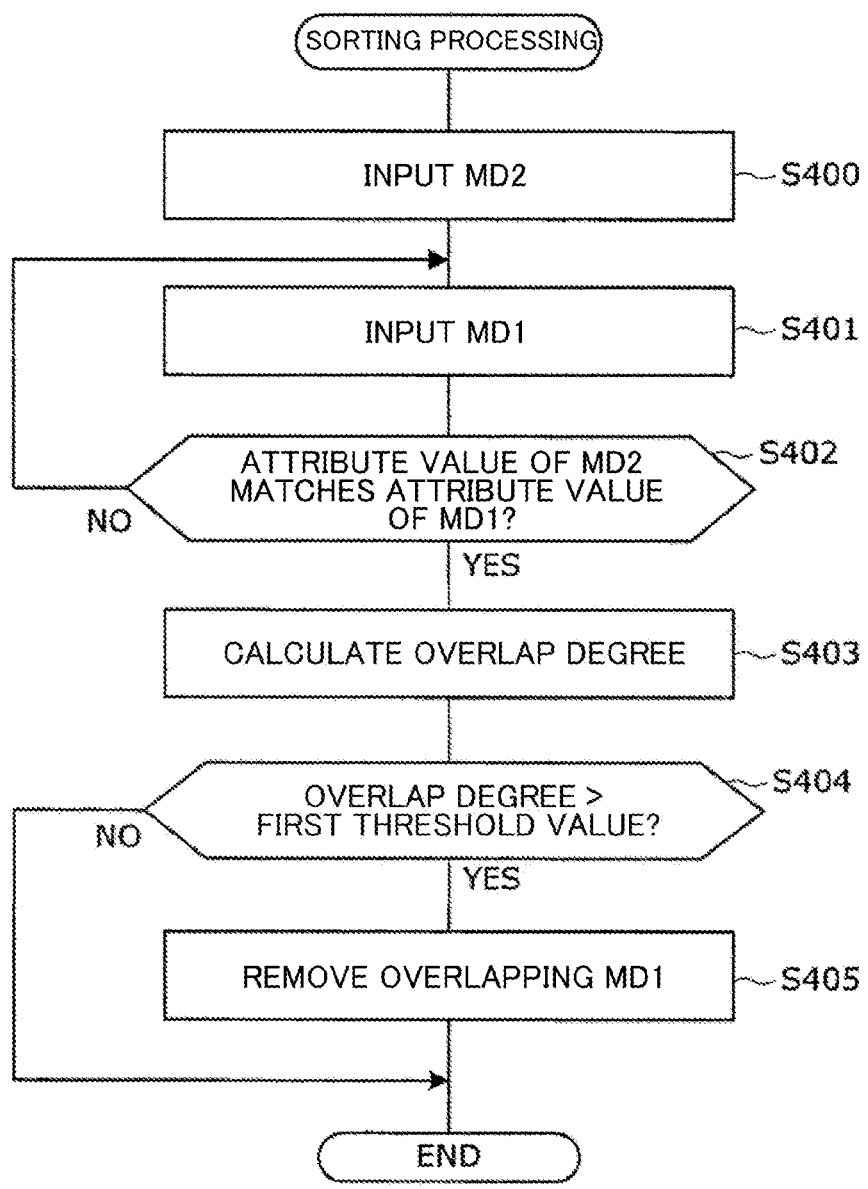
FIG. 9 is a flowchart for illustrating metadata sorting processing performed by the image processing device according to the first embodiment.

As shown in FIG. 9, first, the metadata MD2 of the overall image generated by the second processing unit 120 is input to the sorting unit 131 (step S400). Next, the metadata MD1 of one of the plurality of divided images generated by the first processing unit 110 is input to the sorting unit 131 (step S401).

Next, the sorting unit 131 determines whether or not the attribute value of the metadata MD2 of the overall image matches the attribute value of the metadata MD1 of the divided image (step S402). If the attribute value of the metadata MD2 of the overall image matches the attribute value of the metadata MD1 of the divided image (step S402: YES), the calculation unit 310 calculates the overlap degree (step S403). More specifically, the calculation unit 310 calculates the overlap degree obtained by dividing the area in which the quadrangular frame BB2 included in the metadata MD2 of the overall image and the quadrangular frame BB1 included in the metadata MD1 of the divided image overlap each other by the area of the quadrangular frame BB1.

Note that if the attribute value included in the metadata MD2 of the overall image does not match the attribute value included in the metadata MD1 of the divided image in step S402 (step S402: NO), the processing transitions to step S401, and another piece of attribute information included in the metadata MD1 of the same divided image is input (step S401).

For example, the attribute value included in the metadata MD1 of the divided image and the attribute value included in the metadata MD2 of the overall image may be different from each other, as with, for example, "dog" and "bicycle".

Next, if the overlap degree calculated in step S403 exceeds the pre-set first threshold value (step S404: YES), the determination unit 311 determines that the attribute information of the metadata MD1 of the divided image and the attribute information of the metadata MD2 of the overall image is the same attribute information, and the attribute information that is the same is removed from the metadata MD1 (step S405). In other words, the attribute information of the metadata in which the attribute values of the objects detected in the divided image and the overall image are the same and the object is in a corresponding positional relationship in the input image $I_{in}$ is excluded from the metadata MD1 of the divided image.

On the other hand, if the overlap degree is less than the first threshold value (step S404: NO), the processing ends. Thereafter, sorting processing is performed on the attribute information of the metadata MD2 of the overall image, and the attribute information of the metadata held in common between the divided image and the overall image is excluded (steps S400 to S405). Also, the sorting unit 131 executes metadata sorting processing for each of the plurality of divided images.

Thereafter, the processing is returned to the flow of the compositing processing of FIG. 8, and the compositing unit 132 composites the metadata MD1 of the plurality of divided images and the metadata MD2 of the overall image and generates the metadata MD of the input image $I_{in}$ (step S41). The metadata MD1 of the divided image includes attribute information regarding small-sized objects that are not included in the metadata MD2 of the overall image. Also, the metadata MD2 of the overall image may include attribute information regarding a relatively large-sized object that is not included in the metadata MD1 of the divided image.

Thereafter, the metadata MD of the input image $I_{in}$ obtained by compositing can be added to the input image $I_{in}$ and displayed as an image file on the display screen of the display device 108.

As described above, according to the first embodiment, object detection performed based on deep learning is performed using the overall image obtained by shrinking the input image $I_{in}$, and object detection based on deep learning is performed also on the divided images obtained by dividing the input image $I_{in}$. Also, based on the result of object detection using the overall image and the result of object detection of each of the plurality of divided images, the attribute information of the metadata held in common between the overall image and the divided image is removed, and the metadata MD2 of the overall image and the metadata MD1 of the plurality of divided images are composited to generate the metadata MD of the input image $I_{in}$.

For this reason, both relatively large objects and small objects included in the high-definition image can be detected through object detection based on deep learning.

Second Embodiment

Next, a second embodiment of the present invention will be described. Note that in the following description, the configurations that are the same as those in the above-described first embodiment will be denoted by the same reference numerals, and description thereof will be omitted.

In the first embodiment, the overlap degree of the metadata was calculated based on the results of object detection in the divided image and the overall image, and if the overlap degree exceeds the first threshold value, it was determined that the attribute information of the metadata MD1 of the divided image and the attribute information of the metadata MD2 of the overall image are in common with each other, and the attribute information held in common was removed from the metadata MD1 of the divided image. In contrast to this, in the second embodiment, the overlap of metadata is eliminated based on a two-stage threshold value determination.

Figure 1:
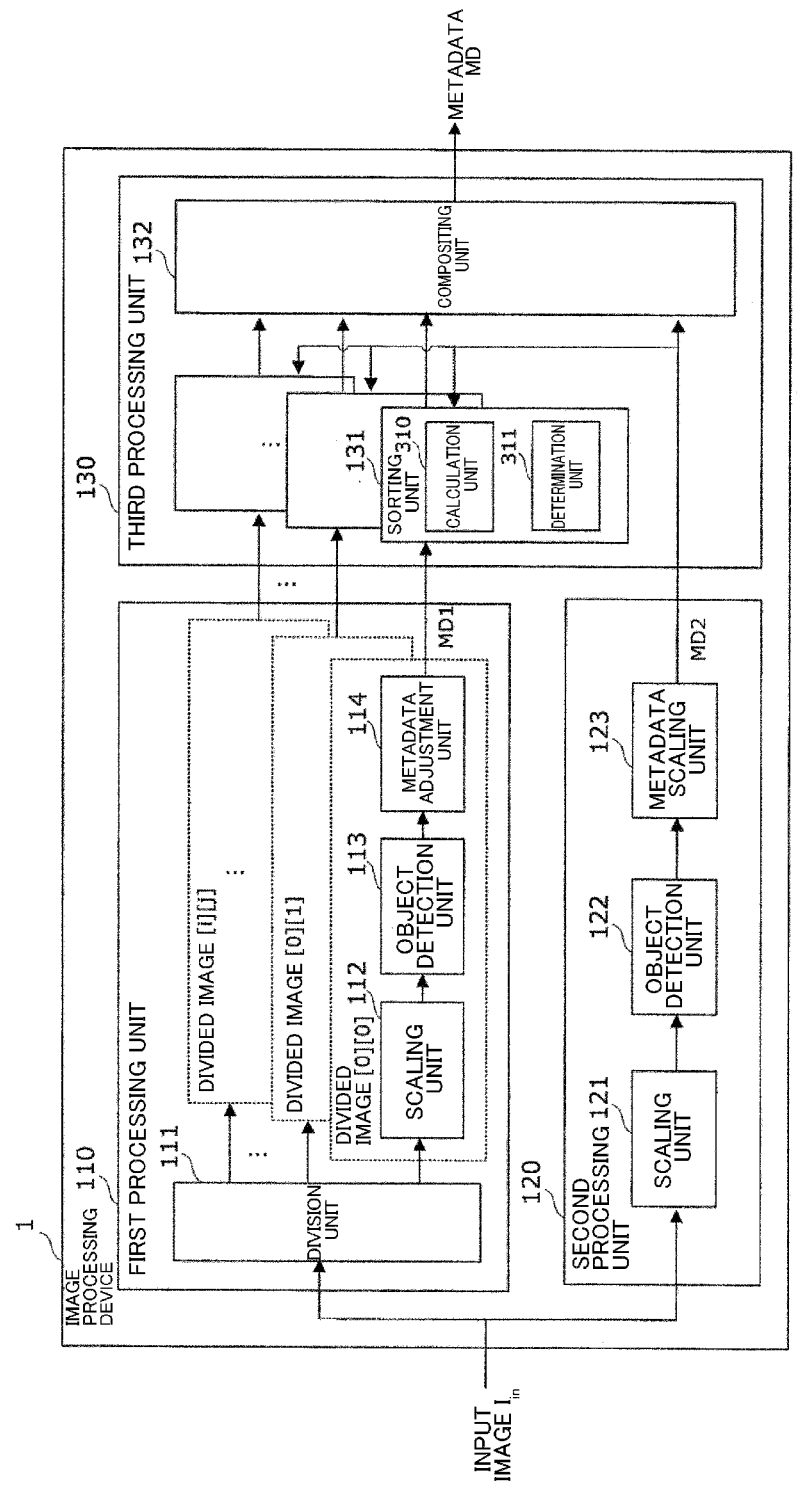
FIG. 1 is a block diagram showing a functional configuration of an image processing device according to a first embodiment of the present invention.

The configuration of the image processing device 1 according to the second embodiment is the same as that of the first embodiment (FIG. 1). Also, the operation of the image processing device 1 according to the present embodiment is the same as that of the first embodiment except for the metadata sorting processing (FIGS. 2 to 8). Hereinafter, the metadata sorting processing executed by the image processing device 1 according to the present embodiment will be described with reference to the flowchart of FIG. 10.

Figure 10:
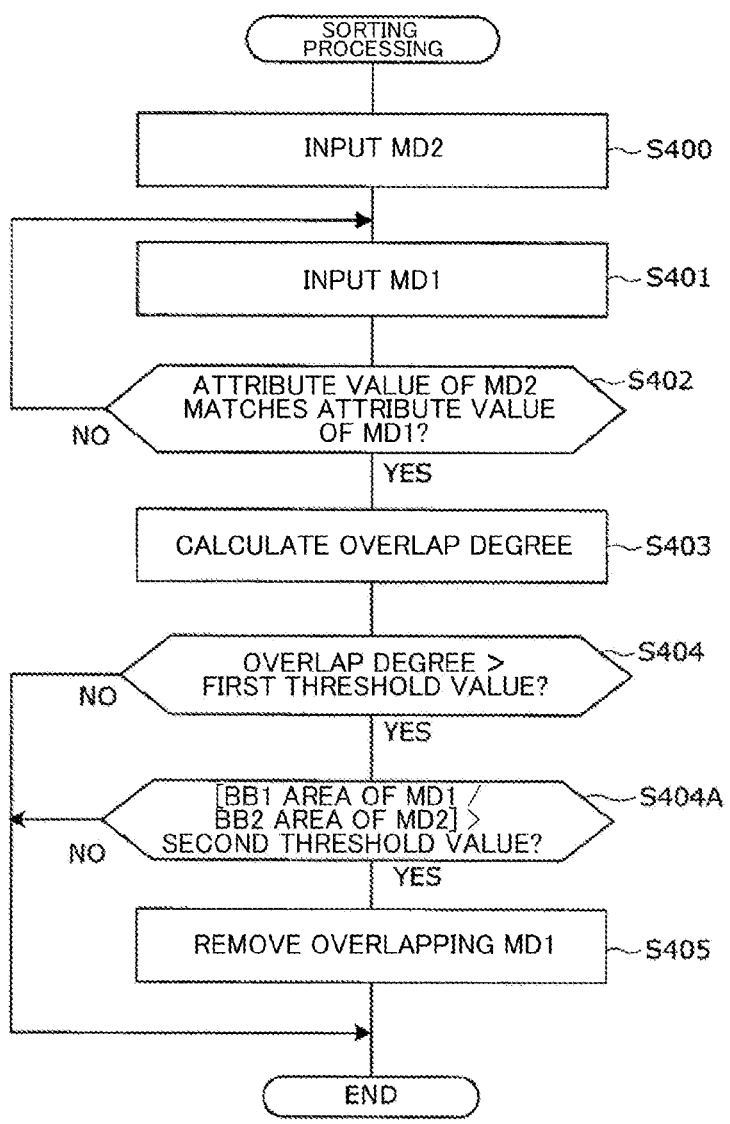
FIG. 10 is a flowchart for illustrating metadata sorting processing performed by an image processing device according to a second embodiment.

As shown in FIG. 10, the sorting unit 131 executes the metadata sorting processing for each divided image based on the metadata MD1 of the divided image and the metadata MD2 of the overall image.

Note that the metadata MD1 and MD2 are sets of attribute information including the attribute value of the object and the quadrangular frames BB1 and BB2 surrounding the object. For example, one piece of attribute information of the metadata MD1 and MD2 includes the attribute value of each object detected in the image through object detection (e.g., "dog") and the information (coordinates and size) of the quadrangular frames BB1 and BB2 created for the detected object. In FIG. 10, a case where sorting processing is executed for each piece of attribute information of each divided image will be described as an example.

As shown in FIG. 10, first, the metadata MD2 of the overall image processed by the second processing unit 120 is input to the sorting unit 131 (step S400). Next, the metadata MD1 of one of the plurality of divided images processed by the first processing unit 110 is input to the sorting unit 131 (step S401).

Next, the sorting unit 131 determines whether or not the attribute value of the metadata MD2 of the overall image matches the attribute value of the metadata MD1 of the divided image (step S402). If the attribute value of the metadata MD2 of the overall image matches the attribute value of the metadata MD1 of the divided image (step S402: YES), the calculation unit 310 calculates the overlap degree (step S403). More specifically, the calculation unit 310 calculates the overlap degree obtained by dividing the area by which the quadrangular frame BB2 included in the metadata MD2 of the overall image and the quadrangular frame BB1 included in the metadata MD1 of the divided image overlap each other by the area of the quadrangular frame BB1.

Note that if the attribute value of the metadata MD2 of the overall image does not match the attribute value of the metadata MD1 of the divided image in step S402 (step S402: NO), the processing advances to step S401 and another attribute value included in the metadata MD1 of the same divided image is input (step S401).

Next, if the overlap degree calculated in step S403 exceeds the pre-set first threshold value (step S404: YES)

and the determination unit 311 (second determination unit) determines that the ratio between the area of the quadrangular frame BB1 included in the metadata MD1 of the divided image and the area of the quadrangular frame BB2 of the overall image exceeds a pre-set second threshold value (step S404A: YES), the sorting unit 131 removes the attribute information that is the determination target from the metadata MD1 (step S405).

More specifically, if the area of the quadrangular frame BB1 of the metadata MD1 of the divided image with respect to the area of the quadrangular frame BB2 included in the metadata MD2 of the overall image exceeds the pre-set second threshold value, the attribute information that is the determination target is removed from the interpolation target in the compositing processing performed by the compositing unit 132 on the metadata MD1 of the divided image and the metadata MD2 of the overall image.

In the present embodiment, the position information in the input image $I_{in}$ of the object detected by the object detection units 113 and 122 is represented by the quadrangular frames BB1 and BB2. Accompanying this, if the size of the object detected in the overall image is relatively large with respect to the area of the overall image, the area of the quadrangular frame BB2 of the object is large and covers the quadrangular frame BB1 of the object detected in the divided image in some cases. In such a case, it is possible to prevent the attribute information of the metadata MD1 of the divided image from being removed erroneously.

As described above, in the present embodiment, the overlap between the metadata MD1 of the divided image and the metadata MD2 of the overall image is eliminated based on the overlap degree and the area ratio between the objects.

On the other hand, if the overlap degree is less than or equal to the first threshold value (step S404: NO), the processing ends. Also, even if the overlap degree exceeds the first threshold value (step S404: YES), if the area ratio between the quadrangular frames BB1 and BB2 is less than or equal to the second threshold value (step S404A: NO), the processing similarly ends.

Thereafter, all the attribute information included in the metadata MD2 of the overall image is subjected to sorting processing, and the attribute information that overlaps in the metadata MD1 of the divided image and the metadata MD2 of the overall image is eliminated (steps S400 to S405). Also, the sorting unit 131 executes metadata sorting processing for each of the plurality of divided images.

Thereafter, the processing is returned to the flow of the compositing processing of FIG. 8, and the compositing unit 132 composites the metadata MD1 of the plurality of divided images and the metadata MD2 of the overall image, and generates the metadata MD of the input image $I_{in}$ (step S41 in FIG. 8).

As described above, according to the second embodiment, in the metadata sorting processing, the sorting unit 131 excludes the attribute information held in common by the metadata MD1 of the divided image and the metadata MD2 of the overall image from the interpolation targets through two-stage threshold value processing, with consideration given to the area ratio between objects as well as the overlap degree.

As a result, the image processing device 1 can more accurately detect both a relatively large object and a small object included in the high-definition image through object detection based on deep learning.

Third Embodiment

Next, a third embodiment of the present invention will be described. Note that in the following description, the same components as those in the first and second embodiments described above are denoted by the same reference numerals, and description thereof will be omitted.

In the second embodiment, in the metadata sorting processing, two-stage threshold value processing was performed, and even if the overlap degree is greater than the first threshold value, if the ratio between the area of the quadrangular frame BB1 included in the metadata MD1 of the divided image and the area of the quadrangular frame BB2 of the object included in the metadata MD2 of the overall image is less than or equal to the second threshold value, it was determined that the attribute information of the metadata MD1 of the divided image and the attribute information of the metadata MD2 of the overall image are not held in common, and they were subjected to interpolation processing performed by the compositing unit 132.

In contrast to this, in the third embodiment, in the metadata sorting processing, furthermore, it is determined whether or not attribute information having an attribute value that does not match any of the attribute values included in the metadata MD2 of the overall image is included in the metadata MD1 of the divided image. If the metadata MD1 includes attribute information having an attribute value that does not match, the area of the quadrangular frame BB1 of the object included in the metadata MD1 of the divided image and the area of the region of the input image $I_{in}$ corresponding to the quadrangular frame BB1 are compared.

The configuration of the image processing device 1 according to the third embodiment is the same as that of the first embodiment (FIG. 1). Also, the operations of the image processing device 1 according to the present embodiment are the same as those of the first embodiment except for the metadata sorting processing (FIGS. 2 to 8). Also, regarding the metadata sorting processing as well, the processing from step S400 to step S405 of the metadata sorting processing (FIG. 10) according to the second embodiment is the same. Hereinafter, the metadata sorting processing executed by the image processing device 1 according to the present embodiment will be described with reference to the flowchart of FIG. 11.

Figure 11:
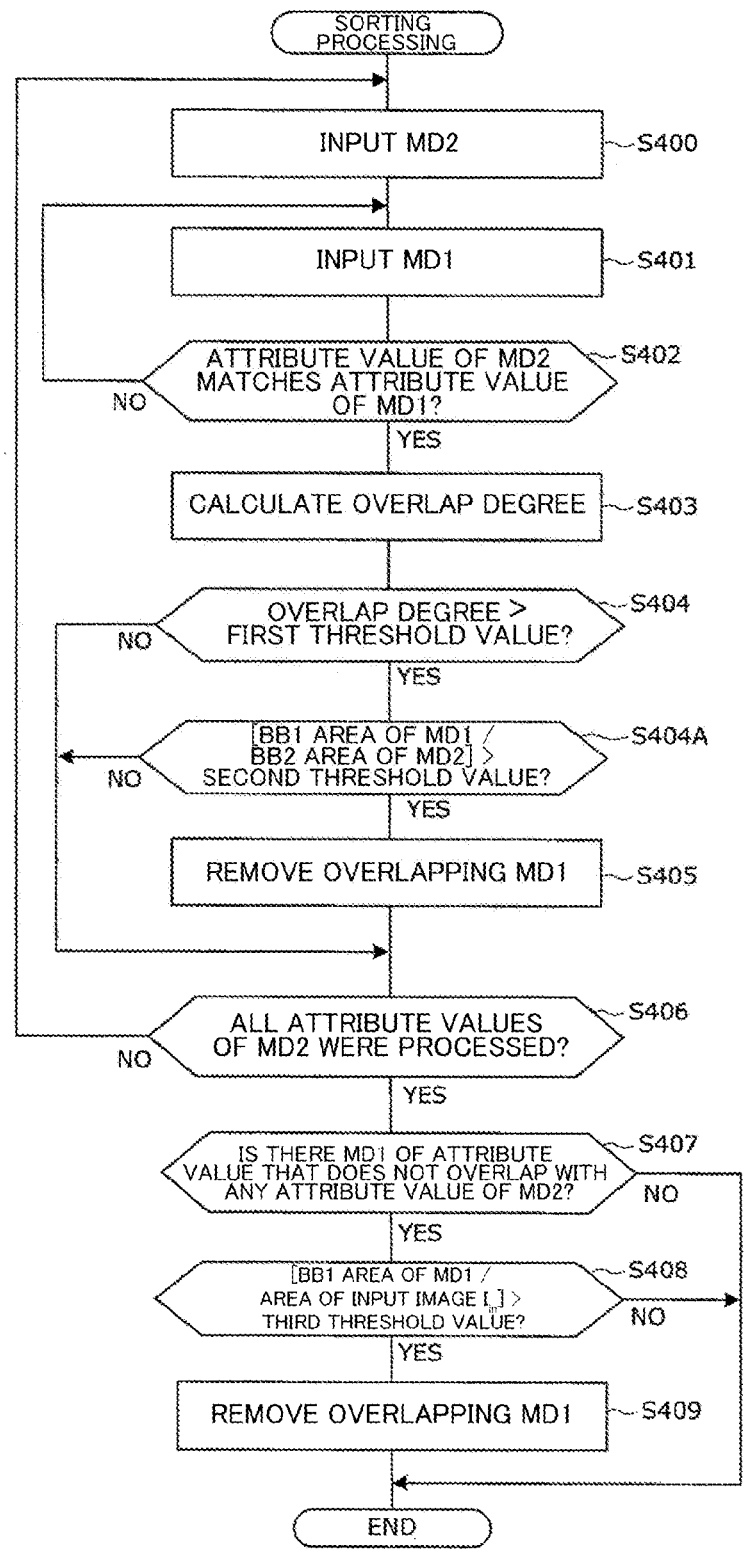
FIG. 11 is a flowchart for illustrating metadata sorting processing performed by an image processing device according to a third embodiment.

As shown in FIG. 11, the sorting unit 131 executes the metadata sorting processing for each divided image based on the metadata MD1 of the divided image and the metadata MD2 of the overall image.

Note that the metadata MD1 and MD2 are sets of attribute information including the attribute value of the object and the quadrangular frames BB1 and BB2 surrounding the object. For example, the attribute information of the metadata MD1 and MD2 includes the attribute value of each object (e.g., "dog") and the information (coordinates and size) of the quadrangular frames BB1 and BB2 created for the detected object. In FIG. 10, a case where sorting processing is executed for each piece of attribute information included in the metadata MD1 of each divided image will be described as an example.

As shown in FIG. 11, first, the metadata MD2 of the overall image generated by the second processing unit 120 is input to the sorting unit 131 (step S400). Next, the metadata MD1 of one of the plurality of divided images generated by the first processing unit 110 is input to the sorting unit 131 (step S401).

Next, the sorting unit 131 determines whether or not the attribute value of the metadata MD2 of the overall image matches the attribute value of the metadata MD1 of the divided image (step S402). If the attribute value of the metadata MD2 of the overall image matches the attribute value of the metadata MD1 of the divided image (step S402: YES), the calculation unit 310 calculates the overlap degree (step S403). More specifically, the calculation unit 310 calculates the overlap degree obtained by dividing the area by which the quadrangular frame BB2 included in the metadata MD2 of the overall image and the quadrangular frame BB1 included in the metadata MD1 of the divided image overlap each other by the area of the quadrangular frame BB1.

Note that if the attribute value of the metadata MD2 of the overall image does not match the attribute value of the metadata MD1 of the divided image in step S402 (step S402: NO), the processing advances to step S401 and another attribute value included in the metadata MD1 of the same divided image is input (step S401).

Next, if the determination unit 311 determines that the overlap degree calculated in step S403 is greater than the pre-set first threshold value (step S404: YES) and the ratio between the area of the quadrangular frame BB1 of the metadata MD1 of the divided image and the area of the quadrangular frame BB2 related to the metadata MD2 of the overall image exceeds the second threshold value (step S404A: YES), the sorting unit 131 removes the attribute information that is the determination target from the metadata MD1 (step S405).

More specifically, if the area of the quadrangular frame BB1 included in the metadata MD1 of the divided image with respect to the area of the quadrangular frame BB2 included in the metadata MD2 of the overall image exceeds the pre-set second threshold value, the sorting unit 131 removes the attribute information that is the determination target from the interpolation targets in the compositing processing performed by the compositing unit 132.

Thus, in the present embodiment, the overlap of the metadata included in the divided image and the overall image is eliminated based on the overlap degree and the area ratio between the objects.

On the other hand, if the overlap degree is less than or equal to the first threshold value (step S404: NO), the processing transitions to step S406. Also, even if the overlap degree exceeds the first threshold value (step S404: YES), if the area ratio is less than or equal to the second threshold value (step S404A: NO), the processing similarly transitions to step S406.

Next, for all of the attribute information contained in the metadata MD2 of the overall image, the sorting unit 131 repeats the processing from step S404 to step S405 until the processing from step S402 to step S404A is complete (step S406: NO). Thereafter, if the processing from step S402 to step S404A is complete for all of the attribute information of the metadata MD2 of the overall image (step S406: YES), the sorting unit 131 compares the attribute value of the metadata MD2 of the overall image and the attribute value of the metadata MD1 of the divided image (step S407).

More specifically, if attribute information having an attribute value that does not match any of the attribute values included in all of the attribute information of the metadata MD2 of the overall image is included in the metadata MD1 of the divided image (step S407: YES), the sorting unit 131 compares the area of the quadrangular frame BB1 of the metadata MD1 of the divided image related to the non-overlapping attribute value and the area of the region of the input image $I_{in}$ corresponding to this quadrangular frame BB1 (step S408).

More specifically, the determination unit 311 determines whether or not a value (third value) obtained by dividing the area of the quadrangular frame BB1 included in the metadata MD1 of the divided image by the area of the corresponding region of the input image $I_{in}$, which is the original image, exceeds a pre-set third threshold value. If the value obtained by dividing the area of the quadrangular frame BB1 by the area of the corresponding region of the input image $I_{in}$ exceeds a pre-set third threshold value (step S408: YES), the attribute information that is the comparison target is removed from the metadata MD1 of the divided image (step S409).

In this manner, if an object having an attribute value that does not match any of the object groups detected in the overall image is detected in the divided image, it is determined whether or not the percentage of the size of the original image of the area of the quadrangular frame BB1 corresponding to the non-matching attribute value exceeds the third threshold value. If the third threshold value is exceeded, the attribute information that is the determination target is determined to be attribute information of an object that was erroneously detected because the feature amount of the object included in the input image $I_{in}$ was divided due to the influence of the image division processing performed by the first processing unit 110.

The sorting unit 131 removes the attribute information relating to the object erroneously detected based on the third threshold value from the metadata MD1 of the divided image, and excludes the attribute information in advance from the interpolation targets in the processing for compositing the metadata MD1 of the divided image and the metadata MD2 of the overall image.

On the other hand, if the value obtained by dividing the area of the quadrangular frame BB1 by the area of the corresponding region of the input image $I_{in}$ is less than or equal to the third threshold value (step S408: NO), the processing ends. The processing similarly ends also in the case where attribute information having an attribute value that does not overlap with any of the attribute values included in the metadata MD2 of the overall image is not included in the metadata MD1 of the divided image (step S407: NO).

In this manner, in step S408, if the value is less than or equal to the third threshold value, the sorting unit 131 determines that the attribute information of the metadata MD1 of the divided image relating to the attribute value that does not match any of the attribute values of the group of objects detected in the overall image is attribute information relating to an object of a relatively small size that could not be detected by the overall processing in the second processing unit 120.

Thereafter, the sorting unit 131 executes metadata sorting processing for each of the plurality of divided images (steps S400 to S409).

Thereafter, the processing is returned to the flow of the compositing processing of FIG. 8, and the compositing unit 132 composites the metadata MD1 of the plurality of divided images and the metadata MD2 of the overall image and generates the metadata MD of the input image $I_{in}$ (step S41 in FIG. 8).

As described above, according to the third embodiment, in the metadata sorting processing, if there is attribute information of the metadata MD1 of the divided image relating to an object having an attribute value that does not match any of the attribute values of the group of objects included in the metadata MD2 of the overall image, threshold value processing is further performed, and attribute information that is held in common is excluded from the metadata MD1.

For this reason, it is possible to exclude metadata MD1 related to erroneous detection of an object accompanying the division of the input image $I_{in}$ by the first processing unit 110. Also, the second processing unit 120 can interpolate an object having a relatively small size, which could not be detected in the overall image obtained by shrinking the input image $I_{in}$, based on the metadata MD1 of the divided image.

As a result, the image processing device 1 can more accurately detect both a relatively large object and a small object included in the high-definition image through object detection based on deep learning.

Fourth Embodiment

Next, a fourth embodiment of the present invention will be described. Note that in the following description, configurations that are the same as those in the first to third embodiments described above are denoted by the same reference numerals, and description thereof is omitted.

In the first to third embodiments, a case in which the image processing device 1 includes one each of the first processing unit 110, the second processing unit 120, and the third processing unit 130 was described. In contrast to this, in the fourth embodiment, the image processing system 1B includes a plurality of image processing devices 1A, and the plurality of image processing devices 1A detect an object included in the input image $I_{in}$.

Figure 12:
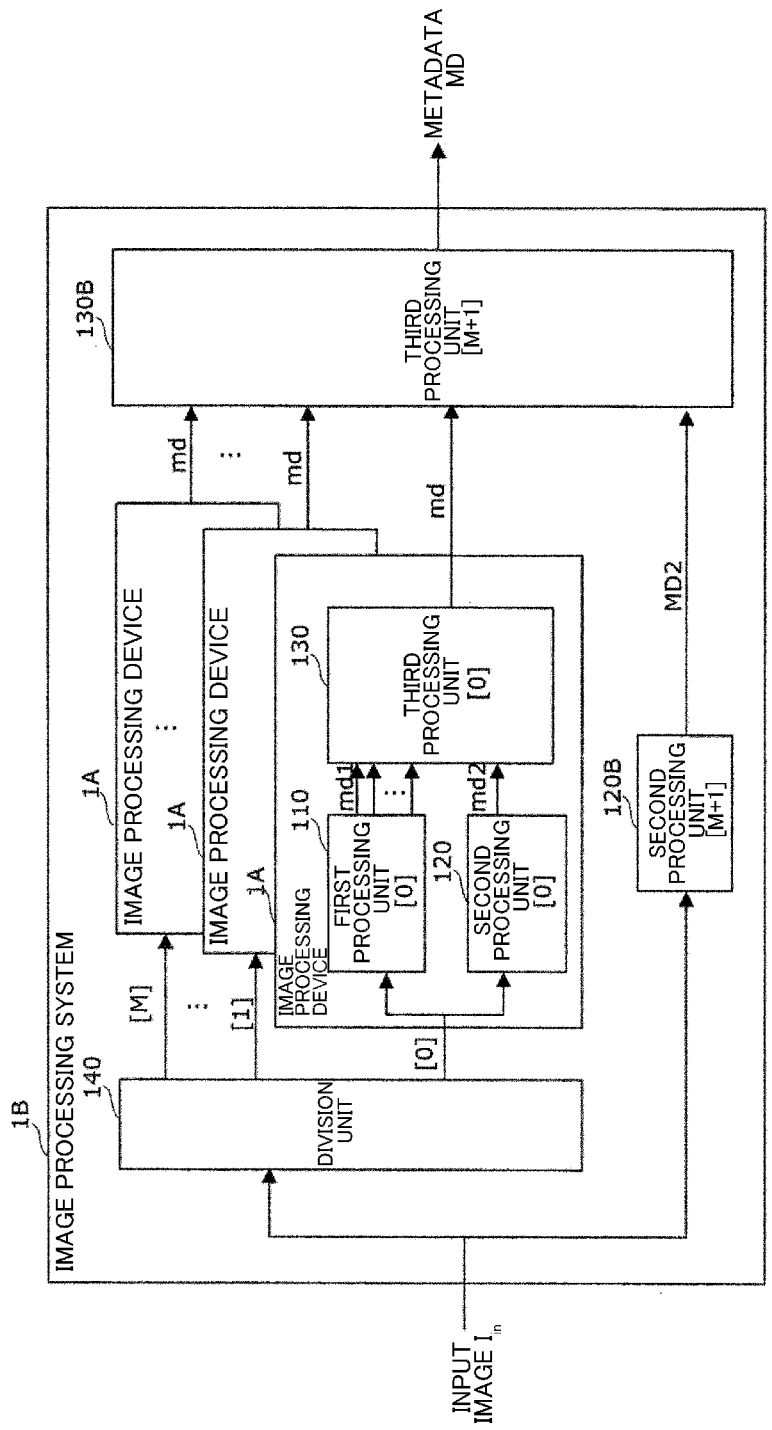
FIG. 12 is a block diagram showing a configuration of an image processing system according to a fourth embodiment.

FIG. 12 is a block diagram showing a configuration of the image processing system 1B according to the fourth embodiment. As shown in FIG. 12, the image processing system 1B includes a plurality of image processing devices 1A, a second processing unit (second processing apparatus) 120B, a third processing unit (compositing processing apparatus) 130B, and a division unit (division apparatus) 140.

In the present embodiment, the image processing system 1B includes M (M>1) image processing devices 1A. Each image processing device 1A includes a first processing unit 110, a second processing unit 120, and a third processing unit 130, similarly to the first to third embodiments (FIGS. 1 and 11).

Also, the configurations of the first processing unit 110, the second processing units 120 and 120B, and the third processing units 130 and 130B are the same as the corresponding configurations described with reference to FIG. 1.

As shown in FIG. 12, the image processing system 1B includes a division unit 140 upstream of the plurality of image processing devices 1A. The division unit 140 divides the input image $I_{in}$ input to the image processing system 1B into M–1 images. The division unit 140 inputs M divided images (third images) to the M image processing devices 1A.

The M image processing devices 1A further divide the M divided images into M' (M'>M) divided images. The M image processing devices 1A perform object detection for each of the M' divided images that were further divided. For example, as shown in FIG. 12, the division unit 140 divides the input image $I_{in}$ into M divided images [0], ..., [M]. The divided image [0] is input to the image processing device 1A, and is divided into a plurality of divided images by the division unit in of the first processing unit 110. Each divided image is scaled to an image size designated by the scaling unit 112 and is input to the object detection unit 113. The object detection unit 113 detects an object included in the divided image using a learned object detection model prepared in advance. The results of object detection include the attribute value of the detected object and the quadrangular frame BB1 surrounding the object.

The result of the object detection is input to the metadata adjustment unit 114, and the coordinates of the quadrangular frame BB1 are mapped to the original divided image [0].

The second processing unit 120 performs object detection of the overall image obtained by shrinking the divided image [0]. More specifically, the scaling unit 121 shrinks the divided image [0] such that an image size that can be input to the object detection model specified in advance is reached.

The scaled divided image [0] is input to the object detection unit 122, and the object included in the divided image [0] is detected through computation of the object detection model. More specifically, the object detection unit 122 designates the attribute value of the object included in the divided image [0] and the quadrangular frame BB2 surrounding the object.

The metadata scaling unit 123 performs scaling processing for expanding the region of the quadrangular frame BB2 of the object included in the entirety of the divided image [0] detected by the object detection unit 122, and maps the quadrangular frame BB2 to the divided image [0] of the original image.

The third processing unit 130 composites metadata md1 of a plurality of divided images obtained by further dividing the divided image [0] output from the first processing unit 110, and metadata md2 of the divided image [0] output from the second processing unit 120, based on the metadata md1 and the metadata md2.

More specifically, the calculation unit 310 calculates the overlap degree between the metadata md1 of the plurality of divided images obtained by further dividing the divided image [0] and the metadata md2 of the divided image [0]. If the overlap degree exceeds the first threshold value, the determination unit 311 removes the attribute information that is the determination target from the metadata md1.

The compositing unit 132 generates metadata md (fourth metadata) of the divided image [0], which is obtained by sorting the metadata using the sorting unit 131 and combining the metadata md2 and the metadata md1 from which the overlapping metadata included in the divided image of the divided image [0] and the entirety of the divided image [0] has been excluded.

In the present embodiment, as shown in FIG. 12, the above-described processing is executed for each of the M divided images using the M image processing devices 1A. Accordingly, a total of M pieces of metadata md for each divided image composited from each of the M image processing devices 1A is output.

Also, as shown in FIG. 12, the image processing system 1B includes a second processing unit 120B and a third processing unit 130B. The image processing system 1B includes a total of M+1 second processing units 120 and 120B and M+1 third processing units 130 and 130B due to the M second processing units 120 and the M third processing units 130 included in the M image processing devices 1A, and the second processing unit 120B and the third processing unit 130B.

The second processing unit 120B executes the overall processing of the input image $I_{in}$. The second processing unit 120B includes a scaling unit 121, an object detection unit 122, and a metadata scaling unit 123.

The scaling unit 121 outputs an overall image (fifth image) obtained by shrinking the input image $I_{in}$, which is the original image. Using the scaled overall image as an input, the object detection unit 122 performs the computation of the learned object detection model and acquires a set of pieces of attribute information including the attribute value of the object included in the overall image and the quadrangular frame BB2 (third region) surrounding the object as the metadata MD2 (fifth metadata) of the overall image. The quadrangular frame BB2 includes the coordinate information in the input image $I_{in}$.

The metadata MD2 of the overall image generated by the object detection unit 122 is input to the metadata scaling unit 123, and the coordinates of the quadrangular frame BB2 of the detected object are mapped to the input image $I_{in}$.

The third processing unit 130B includes a sorting unit 131 and a compositing unit 132. Also, the sorting unit 131 includes a calculation unit 310 and a determination unit 311. The third processing unit 130B receives input of M pieces of metadata md obtained by the M image processing devices 1A, and the metadata MD2 of the overall image obtained by shrinking the input image $I_{in}$, the metadata MD2 having been obtained by the second processing unit 120B.

The calculation unit 310 calculates the overlap degree between the metadata md corresponding to each of the divided images [0], . . . , [M] obtained by the M image processing devices 1A and the metadata MD2 of the overall image obtained by shrinking the input image $I_{in}$ obtained by the second processing unit 120B.

The determination unit 311 determines whether or not the overlap degree calculated by the calculation unit 310 exceeds a pre-set first threshold value.

If the determination unit 311 determines that the overlap degree exceeds the first threshold value, the sorting unit 131 removes the attribute information that is the determination target from the metadata md.

The compositing unit 132 generates and outputs the metadata MD (sixth metadata) of the input image $I_{in}$ by combining the metadata MD2 and the metadata md obtained by sorting the metadata using the sorting unit 131 and from which the overlapping metadata included in the divided images [0], . . . , [M] and the overall image obtained by shrinking the input image $I_{in}$ has been excluded.

As described above, according to the fourth embodiment, the image processing system 1B includes M first processing units 110, M+1 second processing units 120 and 120B, and M+1 third processing units 130 and 130B and hierarchically executes division processing and compositing processing. For this reason, it is possible to suppress a case in which, if the number of divisions of the input image $I_{in}$ is increased, a characteristic portion included in the image is not detected accompanying the division of the image.

Also, since the image processing system 1B includes a plurality of image processing devices 1A, for example, even if the upper limit of the images that can be divided by the image processing device 1A is M', the upper limit of the number of images that can be divided can be expanded.

As a result, even if a high-definition image that exceeds the image size that can be input to the object detection model based on deep learning is used as the input image $I_{in}$, it is possible to detect both a relatively large-sized object and a relatively small-sized object included in the input image $I_{in}$.

Note that in the described embodiment, each functional block included in the image processing devices 1 and 1A can also be constituted by one computer or be distributed over a plurality of computers connected via a network. Similarly, each functional block included in the image processing system 1B can also be realized by one computer, or can be distributed over a plurality of computers on the network.

Also, the image processing device 1 and the image processing system 1B according to the described embodiment can be realized also by a computer and a program, and the program can also be recorded on a storage medium or provided through a network.

The image processing devices 1 according to the first to fourth embodiments described above can also be realized in combination with each other.

Although embodiments of the image processing device, the image processing method, the image processing system, and the image processing program according to the present invention have been described above, the present invention is not limited to the described embodiments, and various modifications that can be assumed by a person skilled in the art can be performed within the scope of the described invention described in the claims. For example, the order of the steps of the image processing method is not limited to the order described above.

REFERENCE SIGNS LIST

1 Image processing device
110 First processing unit
111 Division unit
112, 121 Scaling unit
113, 122 Object detection unit
114 Metadata adjustment unit
120 Second processing unit
123 Metadata scaling unit
130 Third processing unit
131 Sorting unit
132 Compositing unit
310 Calculation unit
311 Determination unit
101 Bus
102 Processor
103 Main storage device
104 Communication I/F
105 Auxiliary storage device
106 Input/output I/O
107 Input device
108 Display device

The invention claimed is:

1. An image processing device comprising:
a division circuit configured to divide an input image and output a plurality of first images;
a first processor configured to:
perform computation of an object detection model prepared in advance by providing each of the plurality of first images as inputs to the object detection model; and
acquire a set of pieces of attribute information including an attribute value of an object included in each of the plurality of first images and a first region surrounding the object, as first metadata of the first images, the first region including coordinate information in the input image;
a scaling circuit configured to output a second image obtained by shrinking the input image;
a second processor configured to:
perform computation of the object detection model by providing the second image as an input to the object detection model; and
acquire a set of pieces of attribute information including the attribute value of the object included in the second image and a second region surrounding the object, as second metadata of the second image, the second region including the coordinate information in the input image; and a compositing processor configured to generate third metadata of the input image by combining the set of pieces of attribute information of the second metadata and a set of pieces of attribute information that are not held in common by the second metadata and the first metadata.

2. The image processing device according to claim 1, wherein the compositing processor further comprises:
a calculation circuit configured to, when the attribute value of the object included in the second metadata and the attribute value of the object included in the first metadata match each other, obtain a first value representing an overlap degree between pieces of attribute information of metadata obtained by dividing an area by which the second region and the first region overlap each other by an area of the first region;
a first determination circuit configured to determine whether or not the first value calculated by the calculation circuit exceeds a pre-set first threshold value; and
in response to a determination that the first value exceeds the first threshold value, the compositing processor is configured to:
determine that the attribute information of the first metadata is held in common with the attribute information of the second metadata; and
generate the third metadata of the input image by excluding the attribute information determined as being held in common from the first metadata and combining the set of pieces of attribute information of the second metadata and the set of pieces of attribute information that are not held in common by the second metadata and the first metadata.

3. The image processing device according to claim 2, wherein the compositing processor further comprises:
a second determination circuit configured to, in response to a determination that the first value exceeds the first threshold value, determine whether or not a second value obtained by dividing the area of the first region of the first metadata by the area of the second region exceeds a pre-set second threshold value; and
in response to a determination that the first value exceeds the first threshold value and a determination that the second value exceeds the second threshold value, the compositing processor is configured to:
determine that the attribute information of the first metadata is held in common with the attribute information of the second metadata; and
generate the third metadata of the input image by excluding the attribute information determined as being held in common from the first metadata and combining a set of pieces of attribute information of the second metadata and the set of pieces of attribute information that are not held in common by the second metadata and the first metadata.

4. The image processing device according to claim 1, wherein the compositing processor further comprises:
a third determination circuit configured to, when an object having an attribute value that does not match any attribute value included in the second metadata is included in the first metadata, determine whether or not a third value obtained by dividing the area of the first region relating to the attribute value that does not match by the area of the region of the input image corresponding to the first region exceeds a pre-set third threshold value; and in response to a determination that the third value exceeds the third threshold value, the compositing processor is configured to:
determine that the attribute information of the first metadata is held in common with the attribute information of the second metadata; and
generate the third metadata of the input image by excluding the attribute information determined as being held in common from the first metadata and combining the set of pieces of attribute information of the second metadata and the set of pieces of attribute information that are not held in common by the second metadata and the first metadata.

5. An image processing system comprising:
a plurality of the image processing devices according to claim 1;
a division apparatus configured to divide the input image and output a plurality of third images to the plurality of image processing devices;
a second processing apparatus; and
a compositing processing apparatus;
wherein each of the image processing devices is configured to use any one of the plurality of third images as an input to generate fourth metadata indicating a set of pieces of attribute information of the third image;
wherein each of the division circuits is configured to divide the third image and output a plurality of fourth images;
wherein each of the first processors is configured to perform computation of the object detection model prepared in advance by providing each of the plurality of fourth images as an input to the object detection model and to acquire a set of pieces of attribute information including the attribute value of the object included in each of the plurality of fourth images and a third region surrounding the object as fifth metadata of the fourth image, the third region including the coordinate information in the input image;
wherein each of the scaling circuits is configured to output fifth images obtained by shrinking the fourth images;
wherein each of the second processors is configured to perform computation of the object detection model by providing each of the fifth images as an input to the object detection model and acquire a set of pieces of attribute information including the attribute value of the object included in the fifth image and a fourth region surrounding the object as sixth metadata of the fifth image, the fourth region including the coordinate information in the input image;
wherein each of the compositing processors is configured to generate seventh metadata of the fourth image by combining the set of pieces of attribute information of the sixth metadata and the set of pieces of attribute information that are not held in common by the sixth metadata and the fifth metadata;
wherein the scaling apparatus is configured to output a sixth image obtained by shrinking the input image;
wherein the second processing apparatus is configured to perform computation of the object detection model prepared in advance by providing the sixth image as an input to the object detection model and acquire a set of pieces of attribute information including the attribute value of the object included in the sixth image and a fifth region surrounding the object as eighth metadata of the sixth image, the fifth region including the coordinate information in the input image; and wherein the compositing processing apparatus is configured to generate ninth metadata of the input image by combining the set of pieces of attribute information of the eighth metadata and a set of pieces of attribute information that are not held in common by the eighth metadata and the seventh metadata.

6. An image processing method comprising:
dividing an input image and outputting a plurality of first images;
performing computation of an object detection model prepared in advance by providing each of the plurality of first images as an input to the object detection model and acquiring a set of pieces of attribute information including an attribute value of an object included in each of the plurality of first images and a first region surrounding the object as first metadata of the first image, the first region including coordinate information in the input image;
outputting a second image obtained by shrinking the input image;
performing computation of the object detection model by providing the second image as an input to the object detection model and acquiring a set of pieces of attribute information including an attribute value of the object included in the second image and a second region surrounding the object as second metadata of the second image, the second region including the coordinate information in the input image; and
generating third metadata of the input image by combining the set of pieces of attribute information of the second metadata and a set of pieces of attribute information that are not held in common by the second metadata and the first metadata.

7. The image processing method according to claim 6, further comprising:
when the attribute value of the object included in the second metadata and the attribute value of the object included in the first metadata match each other, obtaining a first value representing an overlap degree between pieces of attribute information of metadata obtained by dividing an area by which the second region and the first region overlap each other by an area of the first region;
determining whether or not the first value exceeds a pre-set first threshold value; and
in response to a determination that the first value exceeds the first threshold value, determining that the attribute information of the first metadata is held in common with the attribute information of the second metadata and generating the third metadata of the input image by excluding the attribute information determined as being held in common from the first metadata and combining the set of pieces of attribute information of the second metadata and the set of pieces of attribute information that are not held in common by the second metadata and the first metadata.

8. The image processing method according to claim 7, further comprising:
in response to a determination that the first value exceeds the first threshold value, determining whether or not a second value obtained by dividing the area of the first region of the first metadata by the area of the second region exceeds a pre-set second threshold value; and
in response to a determination that the first value exceeds the first threshold value and a determination that the second value exceeds the second threshold value, determining that the attribute information of the first metadata is held in common with the attribute information of the second metadata and generating the third metadata of the input image by excluding the attribute information determined as being held in common from the first metadata and combining a set of pieces of attribute information of the second metadata and the set of pieces of attribute information that are not held in common by the second metadata and the first metadata.

9. The image processing method according to claim 6, further comprising:
when an object having an attribute value that does not match any attribute value included in the second metadata is included in the first metadata, determine whether or not a third value obtained by dividing the area of the first region relating to the attribute value that does not match by the area of the region of the input image corresponding to the first region exceeds a pre-set third threshold value; and
in response to a determination that the third value exceeds the third threshold value, determining that the attribute information of the first metadata is held in common with the attribute information of the second metadata and generating the third metadata of the input image by excluding the attribute information determined as being held in common from the first metadata and combining the set of pieces of attribute information of the second metadata and the set of pieces of attribute information that are not held in common by the second metadata and the first metadata.

10. A non-transitory computer readable medium storing an image processing program for causing a computer to execute the steps of:
dividing an input image and outputting a plurality of first images;
performing computation of an object detection model prepared in advance by providing each of the plurality of first images as an input to the object detection model and acquiring a set of pieces of attribute information including an attribute value of an object included in each of the plurality of first images and a first region surrounding the object as first metadata of the first image, the first region including coordinate information in the input image;
outputting a second image obtained by shrinking the input image;
performing computation of the object detection model by providing the second image as an input to the object detection model and acquiring a set of pieces of attribute information including an attribute value of the object included in the second image and a second region surrounding the object as second metadata of the second image, the second region including the coordinate information in the input image; and
generating third metadata of the input image by combining the set of pieces of attribute information of the second metadata and a set of pieces of attribute information that are not held in common by the second metadata and the first metadata.

* * * * *